Nov. 12, 1946.   L. F. SCOTT   2,411,063
ADJUSTABLE BACK SEAT
Filed May 23, 1942   2 Sheets-Sheet 1
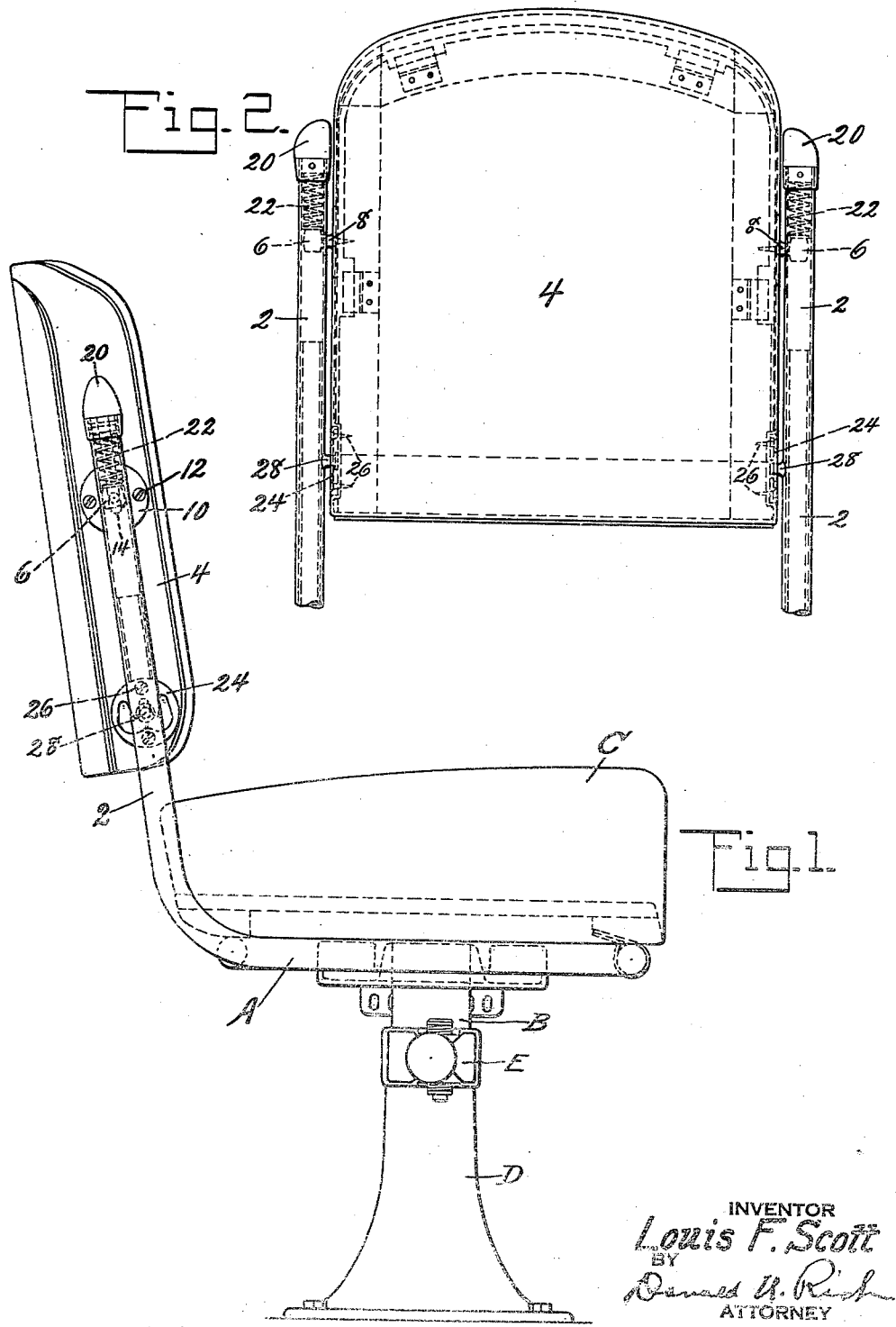
INVENTOR
Louis F. Scott
BY
ATTORNEY

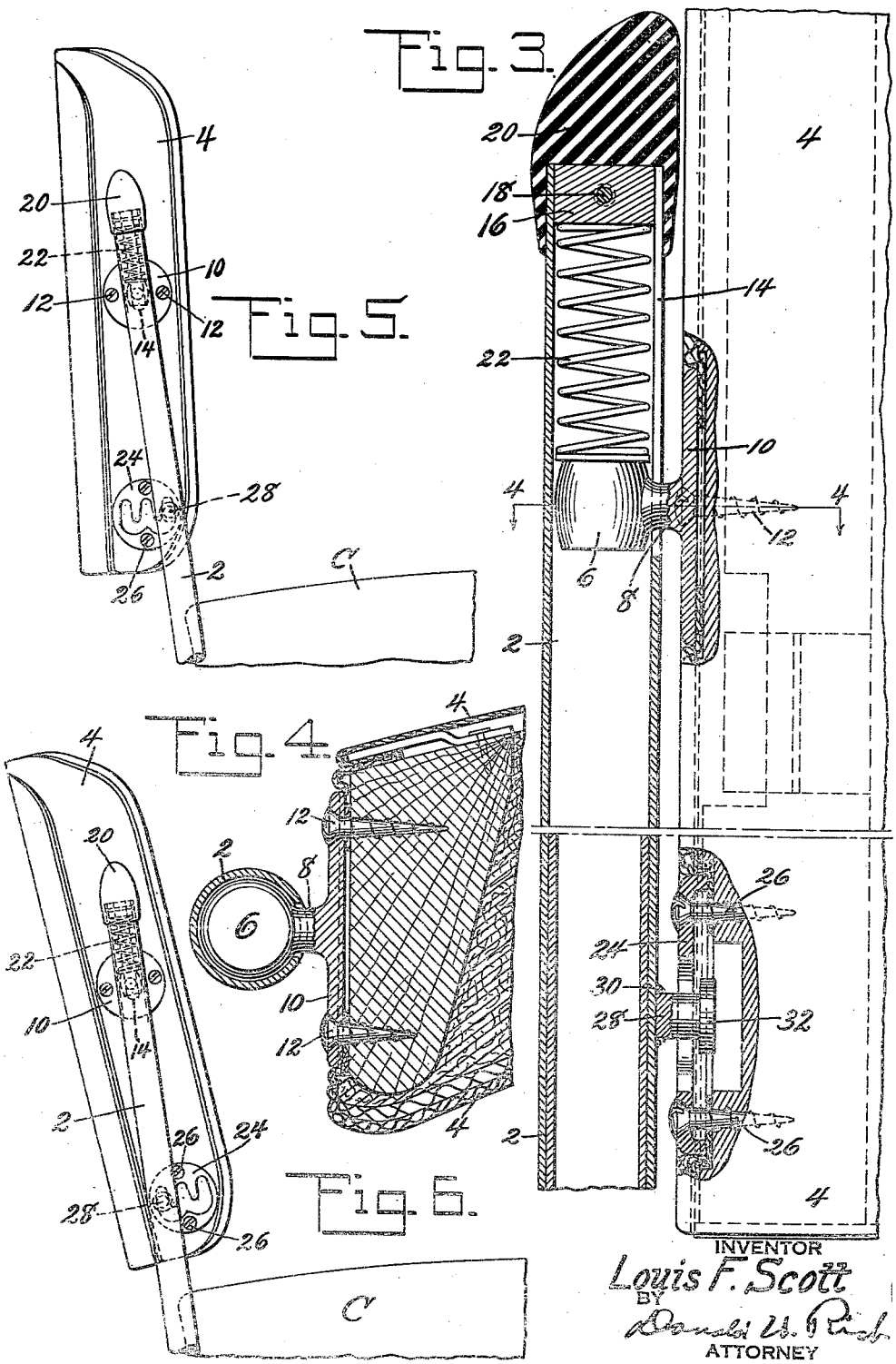

Patented Nov. 12, 1946

2,411,063

UNITED STATES PATENT OFFICE 2,411,063

ADJUSTABLE BACK SEAT

Louis F. Scott, Philadelphia, Pa., assignor to ACF-Brill Motors Company, New York, N. Y., a corporation of Delaware Application May 23, 1942, Serial No. 444,239

2 Claims. (Cl. 155—158)

1

This invention relates to adjustable back seats and particularly to adjustable backs for seats such as are provided in buses and similar vehicles for use of the operator. It is desirable that the backs of seats of this type be easily and quickly adjustable to various angles of inclination, avoiding as much as possible the use of complicated mechanism for this purpose. It is an object of the present invention, therefore, to provide an extremely simple adjustable seat back construction in which the use of such parts as levers, rods, push buttons, etc. is dispensed with.

Another object of the invention is the provision of an adjustable seat back which may be manually raised, in which position it may then be tilted or swung to any one of a plurality of angles of inclination.

A further object of the invention is to provide an adjustable seat back which may be lifted and then tilted to the desired angle of inclination, after which by simply releasing the seat back it will move to the selected adjusted position and be locked in said position.

These and other objects of the invention will be more clearly understood by reference to the following description and accompanying drawings, in which:

Figure 1 is a side elevation view of a seat showing the adjustable seat back in normal position;

Fig. 2 is a rear elevation view of the seat back showing the manner in which it is supported by the seat frame members;

Fig. 3 is an enlarged sectional view at one side of the seat back and supporting frame construction, certain parts being broken away to better show the connection of the seat back with the seat frame member;

Fig. 4 is a sectional view taken on the line 4—4, Fig. 3;

Fig. 5 is a side elevation view showing the seat back in the extreme forward adjusted position; and Fig. 6 is a view similar to Fig. 5, but showing the seat back in the extreme rearward adjusted position.

Referring now more particularly to the drawings, the invention is shown in Fig. 1 as embodied in a bus operator's seat comprising a tubular seat frame A secured in any suitable manner to a cylindrical supporting member B and provided with a cushion C. The supporting member B is in turn adjustably supported in pedestal D by means of the mechanism E, thus permitting the height of the seat to be adjusted as desired. The particular construction of the seat forms no part

2 of the invention and hence is not described in detail. The invention may be used with any suitable type of seat so long as the latter is provided with tubular frame members 2 at opposite sides of the seat which adjustably support the seat back 4 in a manner now to be described.

Projecting from each side of the seat back 4, slightly above the central portion thereof, is a barrel-shaped pivot members 6 formed with a nack portion 8 and a circular attaching plate 10 by which it is secured to the side of the seat back as by the wood screws 12. The tubular back supporting frame members 2 are slotted, as indicated at 14 in Fig. 3, to permit the pivot members 6 to be introduced into the tubular members where they are freely slidable, the slots 14 being of such width as to slidably receive the neck portions 8 of the pivot members and of the proper length to permit the necessary sliding movement of the pivot members. The end portions of the tubular back supporting members are closed by a plug 16 held in place by any suitable means such as the pin 18. The caps 20, which may be made of moulded rubber or similar material, are applied over the upper end portions of the tubular frame members to give a finished appearance thereto. A coil spring 22 is compressed between the plug 16 and pivot member 6 within the tubular members 2 at each side of the seat back, and constantly holds the latter in any one of a plurality of adjusted positions, as presently to be described.

A circular adjusting or locking plate 24 formed to provide a substantially W-shaped opening therein is inset into the seat back so as to be flush therewith at each side adjacent the lower portion thereof and secured to the back by means such as wood screws 26. A stud or projection 28 welded as at 30 to the lower portion of the tubular frame member 2 extends through the W-shaped opening in the adjusting plate and is formed with a flat head 32 retaining the stud in operative engagement with the adjusting plate. The seat back is recessed at the region in back of the plate 24 around the head 32 to permit free movement of the stud 28 along the track or guide formed by the W-shaped opening in the adjusting plate. The W-shaped opening constitutes in effect a plurality of downwardly open notches adapted to be selectively engaged by the stud 28 after the seat back is raised against the action of spring 22 and then tilted to the desired angle of inclination. Release of the seat back permits the compressed spring to lower and hold the back in the selected adjusted position. While the opening in the adjusting plate is shown in the present instance as of substantially W shape, thus providing notches permitting three positions of adjustment for the seat back, obviously this opening may be formed to provide a greater number of notches and consequently a greater number of positions of adjustment for the seat back.

From the foregoing description it will be seen that an adjustable seat back arrangement has been provided which is simple in construction, easily and quickly operated, and in which complicated mechanism has been eliminated. By simply lifting the seat back, the latter is free to be tilted to the desired angle of adjustment, and upon release the back will be lowered to and locked in the selected adjusted position.

While the invention has been described more or less in detail, it is apparent that various changes may be made in the arrangement of parts and all such changes are contemplated as will fall within the scope of the following claims.

What is claimed is:

1. In a seat, the combination of a seat back provided with recesses in the sides thereof, tubular back supporting frame members having slots formed therein, means pivotally supporting the seat back on said frame members, said means being slidably arranged within said tubular frame members and in said slots whereby to permit vertical shifting of said seat back, an adjusting plate overlying said recesses and formed with a substantially W shaped opening to provide a plurality of downwardly open notches, and projections on said tubular frame members extending through said W shaped openings and adapted to be selectively engaged by said notches upon vertical shifting and tilting of the seat back to adjustably position the latter, said projections being formed with an enlarged head portion arranged in said recesses and retaining said projections and adjusting plate in operative engagement.

2. In a seat, the combination of a seat back, tubular back supporting frame members arranged at each side of said seat back and having elongated slots formed therein, means fixed to the seat back for pivotally and slidably supporting the same in the slots of said frame members, said means comprising projecting studs formed with enlarged end portions for arrangement within the tubular members, and reduced intermediate portions for sliding movement in said slots, spring means in said tubular members normally engaging said enlarged end portions and urging said seat back downwardly in said frame, and means for angularly adjusting the lower portion of said seat back on said studs including plate like elements fixed to the lower portion of the sides of the seat back and formed with a series of upwardly facing communicating notches, the walls of said plate and adjacent seat back portions being configured to provide a space therebetween, and headed projections extending from the tubular frame members and selectively engaging in said notches, the heads of said projections being freely movable in the space between said plate and seat back and the neck of said projections being held in engagement in the selected notches by said springs.

LOUIS F. SCOTT.